United States Patent [19]
Ishimoto

[11] Patent Number: 6,070,132
[45] Date of Patent: May 30, 2000

[54] POSITION DETECTING APPARATUS

[75] Inventor: Shigeru Ishimoto, Yokohama, Japan

[73] Assignee: Sony Precision Technology Inc., Tokyo, Japan

[21] Appl. No.: 08/959,467

[22] Filed: Oct. 28, 1997

[30] Foreign Application Priority Data

Oct. 28, 1996  [JP]  Japan .................................. 8-285340

[51] Int. Cl.$^7$ ...................................................... G01H 17/00
[52] U.S. Cl. ................................ 702/158; 73/657; 73/659
[58] Field of Search .............................. 702/158; 73/650, 73/660, 657, 659; 324/309, 319; 359/824, 823, 694, 698

[56] References Cited

U.S. PATENT DOCUMENTS

5,734,108  3/1998  Walker ....................................... 73/650

*Primary Examiner*—Kamini Shah
*Attorney, Agent, or Firm*—Foley & Lardner

[57] ABSTRACT

A displacement detecting apparatus includes a scale having a graduation of predetermined pitches, a sensor which is displaceable with respect to the scale and detects a period signal corresponding to the pitch. Interpolating sections interpolate the periodic signal from the sensor by different resolutions. One of the interpolating sections outputs a first interpolation signal of m (positive integer) phases shifted by a phase difference θ1, and the other interpolating sections outputs a second interpolation signal of n (positive integer) phases shifted by a phase difference θ2.

9 Claims, 11 Drawing Sheets

POSITION DETECTING APPARATUS

BACKGROUND OF THE INVENTION

The present invention relates to improvements in a position detecting apparatus for detecting a displacement amount between relatively displacing two parts such as a scale and a sensor applied to a machine tool or precision measuring apparatus, and more particularly to an position detecting apparatus which is simplified in structure and improves a control accuracy of a servo motor thereof.

Generally, a position detecting apparatus for a machine tool or precision measuring apparatus employs a servo mechanism in order to correspond a relative position of two relatively displacing parts with a target position. An alternating servomotor is mainly applied to such a servo mechanism. In order to control an alternating servomotor, it is necessary to supply digital two-phase signals for controlling position and speed and digital three-phase signal for controlling magnetic field thereof. The two-phase signals for controlling position and speed should be a relatively short cycle signal having a micrometer unit length in order to enable a precise control. The three phase signals for controlling the magnetic field should be a relatively long cycle signal having a cycle corresponding to the pitch of slots of the servomotor. The pitch of the slots is generally several millimeters, and therefore the cycle of the two-phase signals is largely different from that of the three phase signals. Therefore, conventional position detecting apparatuses are generally arranged to have a first scale having graduations corresponding to the cycle of the two-phase signals for position and speed control and a second scale having graduations corresponding to the cycle of the three-phase signals for the magnetic field control. Further, in case that a linear alternating servomotor is employed in a position detecting apparatus, it is necessary to provide two encoders for the two phase signals and the three phase signals.

However, such provision of two scales and two encoders generates problems such that a structure of the serve mechanism is complicated and that adjusting operations for installation thereof and assembling operations thereof are increased. Further, it is difficult for the position detecting apparatus having such construction to accurately correspond the phase difference of the two-phase signals and the three-phase signals.

SUMMARY OF THE INVENTION

It is an object of the present invention to provide a position detecting apparatus which solves the above mentioned problems.

Figure 1:
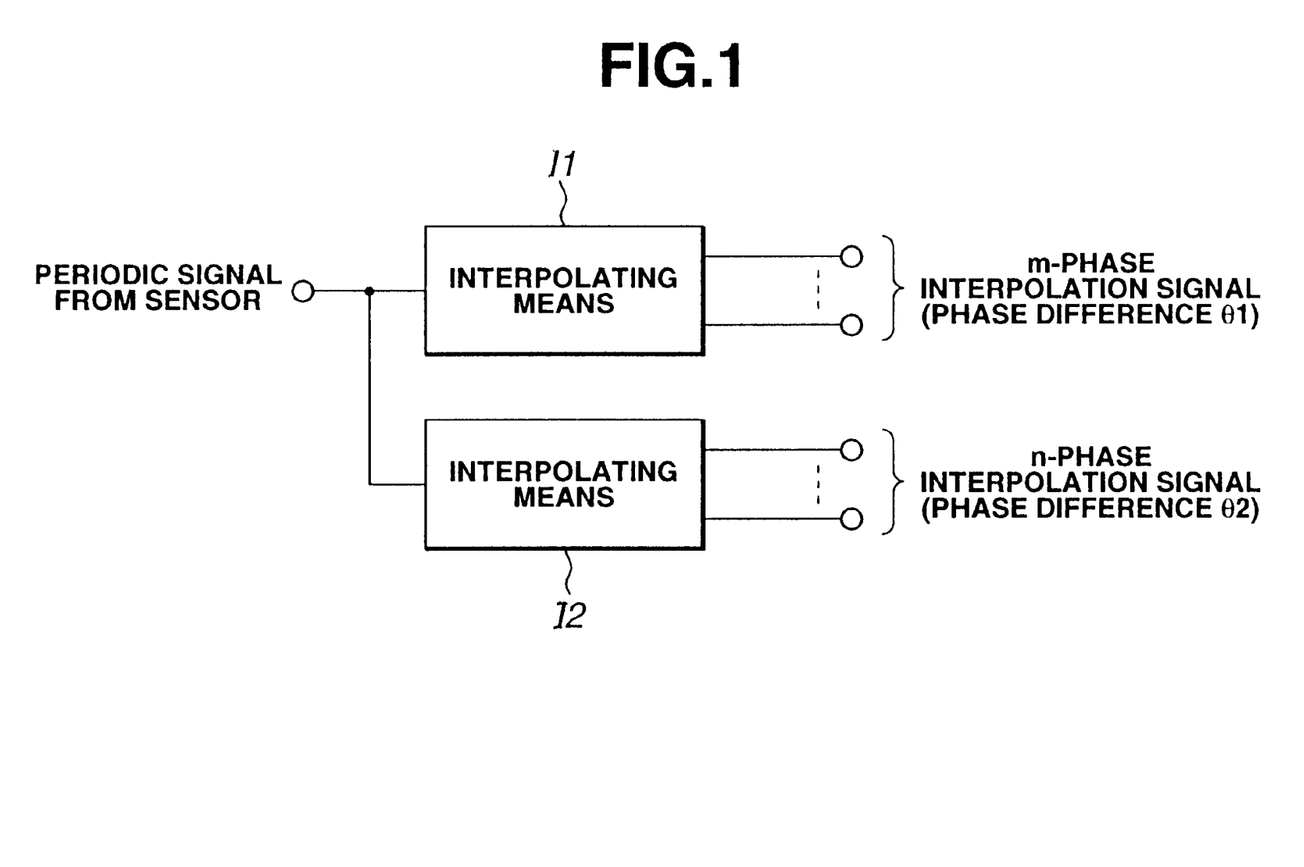
FIG. 1 is a schematic block diagram showing a basic construction of an interpolating device for a position detecting apparatus in accordance with the present invention.

In brief, a position detecting apparatus according to the present invention is arranged, as shown in FIG. 1, to comprise a scale having a graduation of predetermined pitches, a sensor which is displaceable with respect to the scale and detects a period signal corresponding to the pitch and a plurality of interpolating means I1 and I2 shown in FIG. 1, which interpolate the periodic signal from the sensor by different resolutions. One I1 of the interpolating means outputs a first interpolation signal of m (positive integer) phases shifted by a phase difference θ1, and the other interpolating means I2 outputs a second interpolation signal of n (positive integer) phases shifted by a phase difference θ2.

An aspect of the present invention resides in a position detecting apparatus according comprising a scale, a sensor and a plurality of interpolating means. The scale has graduation marked at predetermined pitches. The sensor is displaceable with respect to the scale and detects periodic signals indicative of cycles corresponding to the pitches of the graduation lines. The plurality of interpolating means interpolate the periodic signals. At least one of the interpolating means outputs a first integer number of first interpolation signals which differ in phase by a first predetermined angle. At least one of the interpolating means except for the first interpolation signals outputting interpolating means outputs a second integer number of second interpolation signals which differ in phase by a second predetermined angle.

DETAILED DESCRIPTION OF THE INVENTION

Referring to FIGS. 2 to 5, there is shown a first embodiment of a position detecting apparatus according to the present invention.

Figure 2:
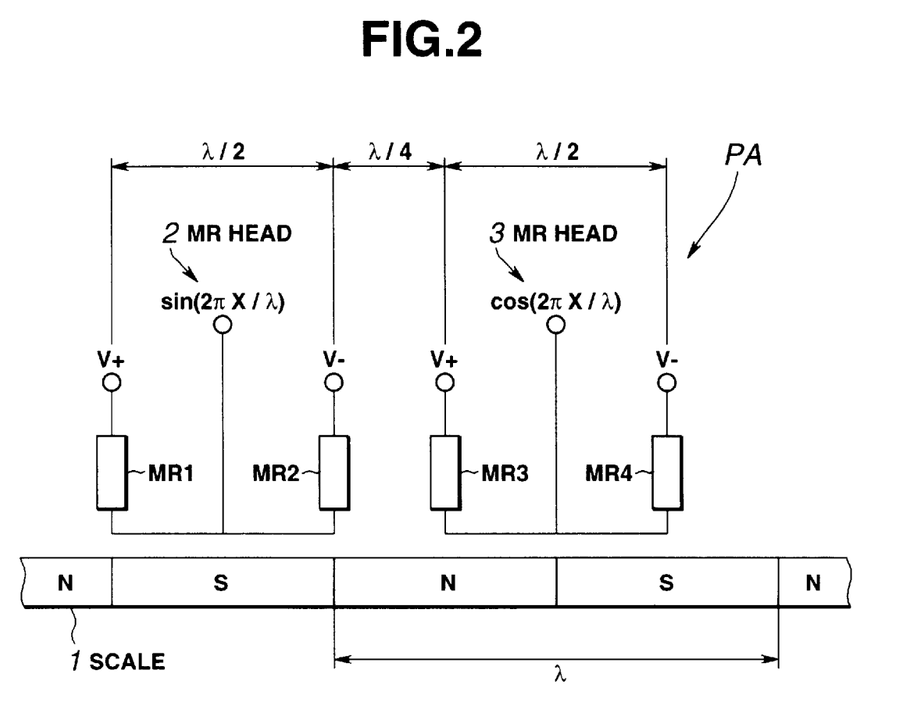
FIG. 2 is a schematic view of a magnetic position detecting apparatus employing MR elements according to the present invention.

The position detecting apparatus PA according to the present invention is of a magnetic type employing a MR element (magnetic resistor element) as shown in FIG. 2. The position detecting apparatus PA comprises a scale 1 on which magnetic graduation lines are recorded at predetermined pitches λ. First and second MR heads 2 and 3 are disposed along the scale 1. A pair of MR elements MR1 and MR2 arranged into a bridge structure constitute the first MR head 2. Similarly, a pair of MR elements MR3 and MR4 arranged into a bridge structure constitute the second MR head 3. The pair of MR elements MR1 and MR2 of the first MR head 2 are arranged to have a distance $\lambda/2$ therebetween. Similarly, The pair of MR elements MR3 and MR4 of the second MR head 3 are arranged to have a distance $\lambda/2$ therebetween. By applying a voltage between the MR elements MR1 and MR2 of the first MR head 2, a periodic signal according to a relative displace amount x1 is derived from the connecting intermediate point between the MR elements MR1 and MR2 on the basis of the resistance change due to the relative displacement with respect to the scale 1. As to the second MR head 3, by similarly applying a voltage between the MR elements MR3 and MR4 of the MR head 3, a periodic signal according to a relative displace amount x1 is derived from the connecting intermediate point between the MR elements MR3 and MR4 on the basis of the resistance change due to the relative displacement with respect to the scale 1.

The distance between the MR head 2 and 3 is set at a distance one-fourth of one cycle of the periodic signal. As is well known, the cycle of the periodic signal is varied so as to take a pitch $\lambda$ or one-second of the pitch $\lambda$ according to the magnitude of the bias magnetic field. In this embodiment, it is assumed that an appropriate voltage is applied to the MR heads 2 and 3 so as to hold the cycle of the period signal at the pitch $\lambda$. Therefore, the distance between the MR heads 2 and 3 is set at one-fourth of the pitch $\lambda$. The MR heads 2 and 3 detect periodic signals having a phase difference $\lambda/4$ of one-fourth of the cycle therebetween. More particularly, one of the periodic signals is $\sin(2\pi x/\lambda)$ and the other signal is $\cos(2\pi x/\lambda)$. If the bias magnetic field is applied so that the cycle of the periodic signal is set at one-second of the pitch ($\lambda/2$), the distance between the MR heads 2 and 3 may be set at $\lambda/8$ and the distances between the MR elements MR1 and MR2 and between the MR elements MR3 and MR4 are set at $\lambda/4$. This arrangement enables the MR heads 2 and 3 to detect the periodic signals having a phase difference of one-fourth of the cycle.

Figure 3:
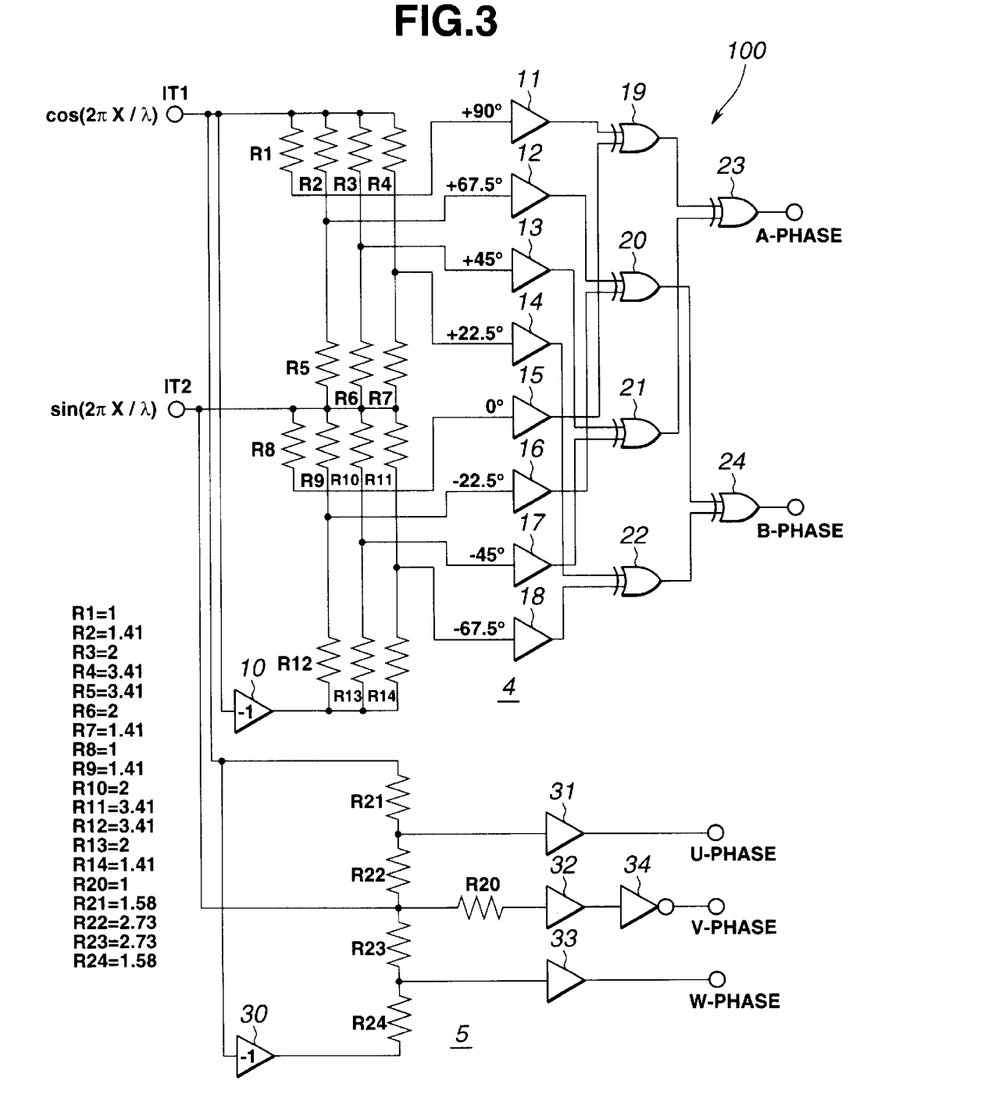
FIG. 3 is a circuit diagram of a first embodiment of an interpolating device employed to the position detecting apparatus in accordance with the present invention.

FIG. 3 shows an interpolating device employed in the embodiment of the position detecting apparatus according to the present invention. The interpolating device 100 includes first and second interpolating circuit 4 and 5 and executes the interpolation of the periodic signals $\sin(2\pi x/\lambda)$ and $\cos(2\pi x/\lambda)$ by means of the vector adding method. Both periodic signals outputted from the MR head 2 and 3 are inputted to both of the interpolating circuit 4 and 5.

Figure 4:
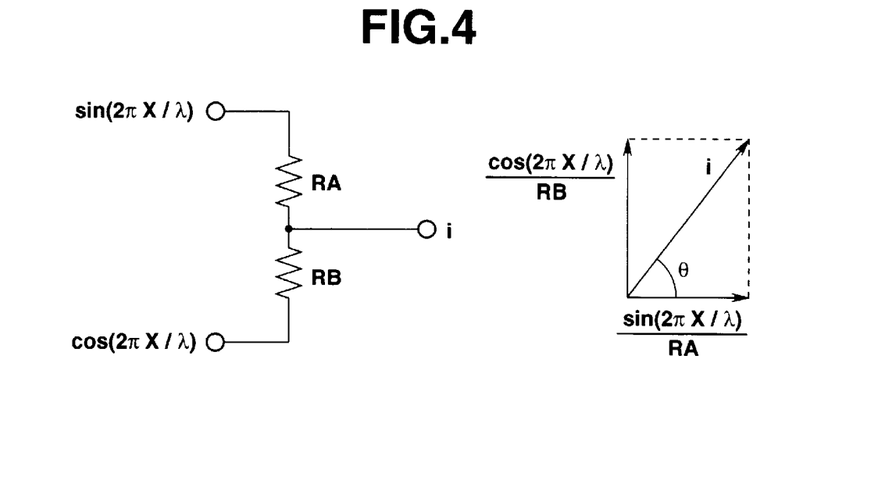
FIG. 4 is a view for explaining a principle of the vector adding method.

The principle of the vector adding method will be discussed with reference to FIG. 4. An input terminal for the periodic signal $\sin(2\pi x/\lambda)$ is connected with an input terminal for the periodic signal $\cos(2\pi x/\lambda)$ through resistors RA and RB, and a connection intermediate point between the resistors RA and RB is connected with an output terminal. In other words, the input terminal for the periodic signal $\sin(2\pi x/\lambda)$ is connected with the output terminal through the resistor RA, and the input terminal for the periodic signal $\cos(2\pi x/\lambda)$ is connected with the output terminal through the resistor RB. Accordingly, as indicated by a vector addition representative of FIG. 4, a signal i, which is phase-shifted with respect to $\sin(2\pi x/\lambda)$ by $\theta=\arctan(RA/RB)$, is outputted from the output terminal. Since it is possible to freely obtain phase-shifted signals of $\sin(2\pi x/\lambda)$ by adjusting the resistance ratio RA/RB, the interpolating device is constructed by assembling a plurality of circuits shown in FIG. 4 upon differentiating each resistance ratio.

The interpolating circuit 4 shown in FIG. 3 is constituted so as to obtain A/B phase signals of 16 division on the basis of the principle of the vector adding method. An input terminal IT1, from which the signal $\cos(2\pi x/\lambda)$ is inputted, is connected to a comparator 11 through the resistor R1, and an input terminal IT2, from which the signal $\sin(2\pi x/\lambda)$ is inputted, is connected to a comparator 15 through a resistor R8. Further, the input terminal IT1 for the signal $\cos(2\pi x/\lambda)$ is connected to a comparator 12 through a resistor R2, and the input terminal IT2 for the signal $\sin(2\pi x/\lambda)$ is connected to the comparator 12 through a resistor R5. The input terminal IT1 is connected with a comparator 13 through a resistor R3, and the input terminal IT2 is connected to the comparator 13 through a resistor R6. The input terminal IT1 is connected to a comparator 14 through a resistor R4, and the input terminal IT2 is connected to the comparator 14 through a resistor R7. The input terminal IT1 is connected to a comparator 16 through a multiplier 10 and a resistor R12, and the input terminal IT2 is connected to the comparator 16 through a resistor R9. The input terminal IT1 is connected to a comparator 17 through the multiplier 10 and a resistor R13, and the input terminal IT2 is connected to the comparator 17 through the resistor R10. The input terminal IT1 is connected to a comparator 17 through the multiplier 10 and a resistor R14, and the input terminal IT2 is connected to the comparator 17 through a resistor R11.

Each resistance of each resistor R1 to R14 is set at each ratio with respect to the resistance R1 as shown in FIG. 2 so as to input each phase shifted signal to each comparator 11 to 18. The phase shifted signals are shifted in phase with respect to the signal $\sin(2\pi x/\lambda)$ by +90 degrees, +67.5 degrees, +45 degrees, +22.4 degrees, 0 degree, -22.5 degrees, -45 degrees and -67.5 degrees.

Each phase shifted signal is quantized by being compared with a predetermined threshold value in each comparator 11 to 18. The output of the comparator 11 and the output of the comparator 15 are inputted to an exclusive OR circuit 19. The output of the comparator 12 and the output of the comparator 16 are inputted to an exclusive OR circuit 20. The output of the comparator 13 and the output of the comparator 17 are inputted to an exclusive OR circuit 21. The output of the comparator 14 and the output of the comparator 18 are inputted to an exclusive OR circuit 22. Furthermore, the output of the exclusive OR circuit 19 and the output of the exclusive OR circuit 21 are inputted to an exclusive OR circuit 23. The output of the exclusive OR circuit 20 and the output of the exclusive OR circuit 22 are inputted to an exclusive OR circuit 24. The exclusive OR circuits 23 and 24 output A-phase signal and B-phase signal shown in FIGS. 5A and 5B, respectively. The A-phase signal and the B-phase signal are of the 16 division of the cycle of the periodic signal and have a phase difference 90 degrees therebetween. The A-phase signal and the B-phase signal are sent to an alternating servomotor (not shown) of a servo mechanism as two-phase signals for controlling the position and speed thereof.

The interpolating circuit 5 is arranged so as to obtain U-phase signal, V-phase signal and W-phase signal. The input terminal IT2 for the signal $\sin(2\pi x/\lambda)$ is connected to a comparator 32 through a resistor R20. The input terminal IT2 for the signal $\sin(2\pi x/\lambda)$ is connected to a comparator 31 through a resistor R22, and the input terminal IT1 for the signal $\cos(2\pi x/\lambda)$ is connected to the comparator 32 through a resistor R21. The input terminal IT2 is connected to a comparator 33 through a resistor R23, and the input terminal IT1 is connected to the comparator 33 through a multiplier 20 (multiple coefficient=-1) and a resistor R24.

Figures 5A, 5B:
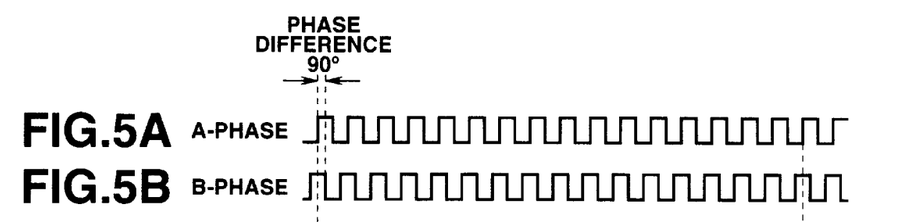
FIGS. 5A to 5E are graphs showing wave forms of A-phase signal, B-phase signal, U-phase signal, V-phase signal and W-phase signal obtained from the interpolating device of FIG. 3.
Figures 5C, 5D, 5E:
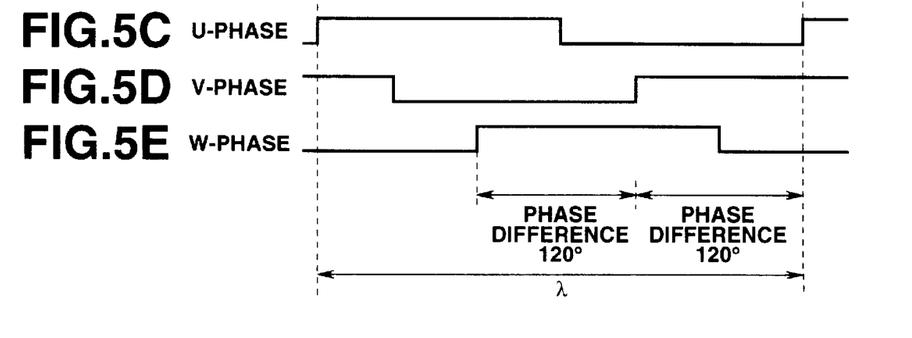

The resistance value of each resistor R20 to R24 is set at a ratio with respect to the resistance R20 as shown in FIG. 2. Therefore, each comparator 31, 32, 33 receives a shifted signal shifted with respect to the signal $\sin(2\pi x/\lambda)$ by 60 degrees, 0 degree, −60 degree. Each shifted signal is quantized at each comparator 31 to 33. The output signal of the comparator 32 is inverted at an inverter 34 to phase-shift the signal by 180 degrees. Therefore, U-phase signal, V-phase signal and W-phase signal having a phase difference therebetween are obtained as shown in FIGS. 5C, 5D and 5E. The U-phase signal, the V-phase signal and the W-phase signal are inputted to the alternating servomotor as three-phase signals for controlling the magnetic field.

With the above-mentioned arrangement, it becomes possible to simultaneously obtain the two-phase signals for controlling the position and the speed of the alternating servomotor and the three phase signals for controlling the magnetic field of the alternating servomotor on the basis of the periodic signals $\sin(2\pi x/\lambda)$ and $\cos(2\pi x/\lambda)$.

Figure 6:
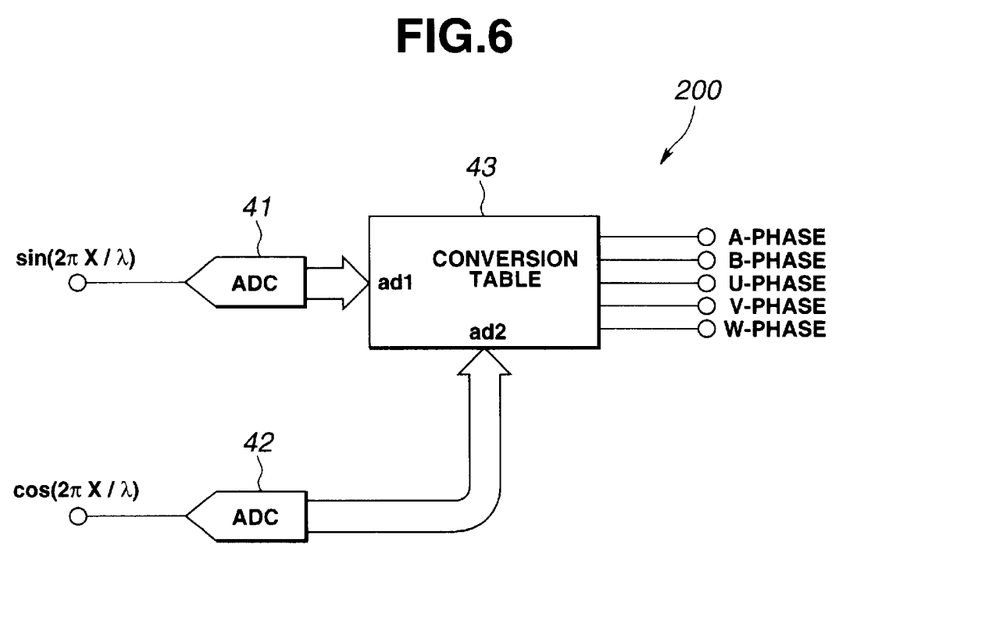
FIG. 6 is a block diagram which shows a second embodiment of the interpolating device of the position detecting apparatus according to the present invention.

Referring to FIG. 6, a second embodiment of the position detecting apparatus according to the present invention will be discussed. The construction of the scale 1 and the MR heads 2 and 3 of the second embodiment is completely the same as those of the first embodiment. Therefore, the explanation thereof will be omitted herein. The interpolating device 200 of the second embodiment is arranged such that an interpolation is executed by using a pair of ADC (analog-to-digital converter) 41 and 42 and a conversion table 43. The signals $\sin(2\pi x/\lambda)$ and $\cos(2\pi x/\lambda)$ are inputted to the ADC 41 and 42 performing n-bits resolution to convert them to the digital signals, respectively. The converted digital signals are inputted to n-bits address inputs ad1 and ad2 of the conversion table 43, respectively. The conversion table 43 is constituted by a ROM (read only memory) which has a memory area storing a number $2^{2n}$ of 2n-bits signal. One of the input signals inputted to the address inputs ad1 and ad2 is stored at upper n-bits of the memory area of 2n-bit and the other of the input signals is stored at lower n-bits of the memory area of 2n-bits such as 16 bits.

The principle of this method using ADC and a conversion table will be discussed hereinafter.

Figure 7:
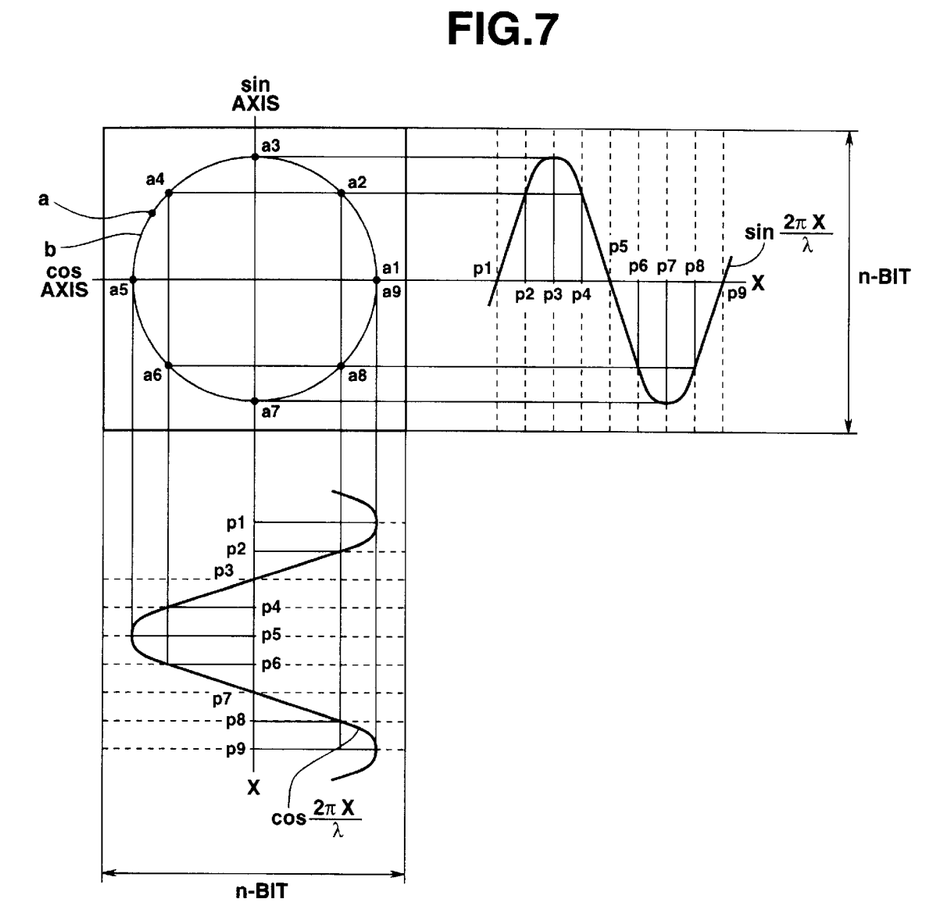
FIG. 7 is a view for explaining a principle of an interpolating method using a pair of ADC and a conversion table.

It is assumed that the conversion table 43 includes two-dimensional address plane having an axis of sin component and an axis of cos component in the conversion table as shown in FIG. 6 and that a coordinate point (address bit) determined on the address plane according to the digitized signals $\sin(2\pi x/X)$ and $\cos(2\pi x/\lambda)$ to be inputted to the address input ad1 and ad2 is set on the address plane. The locus of the address bit a according to the changes of signals $\sin(2\pi x/\lambda)$ and $\cos(2\pi x/\lambda)$ forms a circle b on the two-dimensional address plane, and the one cycle of the signals $\sin(2\pi x/\lambda)$ and $\cos(2\pi x/\lambda)$ corresponds to a round of the circle b on the two-dimensional address plane. In FIG. 7, the values of the signals $\sin(2\pi x/\lambda)$ and $\cos(2\pi x/\lambda)$ at the phases p1, p2, ------ and p9 correspond to the address bit a1, a2, ----- and a9. The phase p1 is equal to the phase p9 are same and therefore the address bit a1 is as same as the address bit a9.

It is assumed that the one round 360 degrees of the circle b is equivalently divided by a division number V and that an address area in the conversion table which area is addressed by the address signal constituted by the signals $\sin(2\pi x/\lambda)$ and $\cos(2\pi x/\lambda)$ corresponding to the address bit in the same division unit. In this embodiment, the division number V is 8 (V=8) as shown in FIG. 7. $2^{2n}$ number of the address areas in the conversion table is classified into V number of equivalent blocks (one block has address areas of $2^2/V$ number). For example, '1' is written on all of front half portion of the address area of each block (the address area corresponding to a hatching lined portion of FIG. 8), and '0' is written on all of the rear half portion of the address area of each block (the address area corresponding to a white portion of FIG. 8).

With this arrangement, '1' and '0' are alternatively read out from the address areas of a number $2^{(2n-1)}/V$ in the conversion table according to the change of the signals $\sin(2\pi x/\lambda)$ and $\cos(2\pi x/\lambda)$. Therefore, an interpolation signal having a division number V is obtained during the one cycle of the signals $\sin(2\pi x/\lambda)$ and $\cos(2\pi x/\lambda)$.

According to the above-mentioned principle, the conversion table 43 shown in FIG. 6 is arranged to store the data for U-phase signal, V-phase signal and W-phase signal and the data for A/B phase signal in the respective bits in the 16-bit of each address area.

Figure 9A:
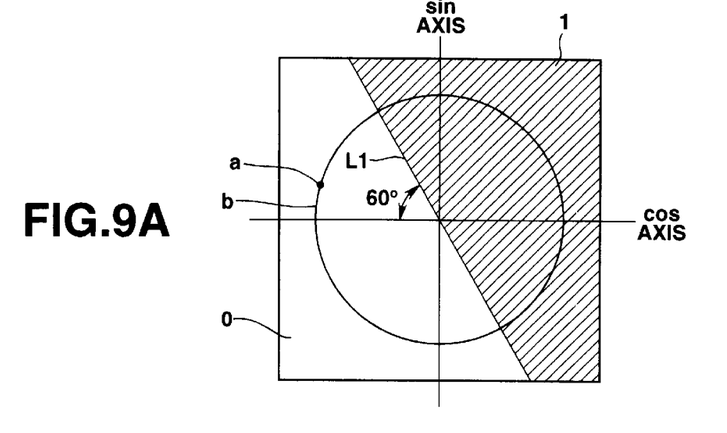
FIGS. 9A to 9C are views for explaining a data storage method in the conversion table.

That is to say, as to one bit in either of 16-bit, it is assumed as shown in FIG. 9A that the circumference is divided into two portions by a line L1 which is obtained by inclining the axis of cos by 60 degrees in the clockwise direction and that '1' is written on the address area corresponding to an address bit located in the upper portion (hatching line portion) divided by the line L1 and '0' is written on the address area corresponding to an address bit located in the lower portion (white portion) divided by the line L1.

Figure 9B:
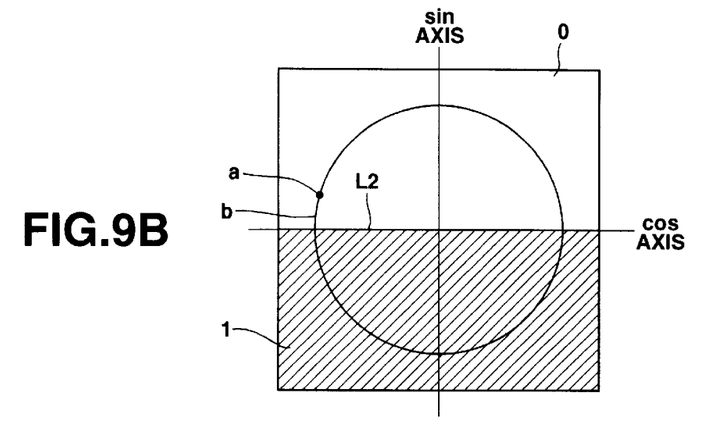

Further, as to anther bit of the 16-bit, it is assumed as shown in FIG. 9B that the circumference is divided into two portion by a line L2 which is obtained by inclining the line L1 by 120 degrees in the clockwise direction and that '1' is written on the address area corresponding to an address bit located in the lower portion (hatching line portion) divided by the line L2 and '0' is written on the address area corresponding to an address bit located in the upper portion (white portion) divided by the line L2.

Figure 9C:
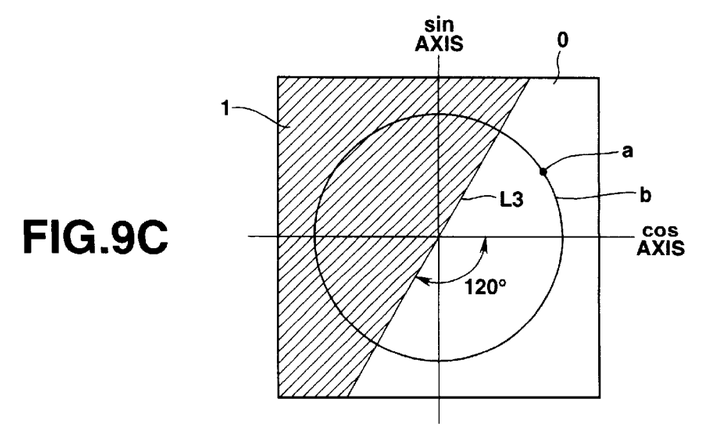

In addition, as to further anther bit of the 16-bit, it is assumed as shown in FIG. 9C that the circumference is divided into two portion by a line L3 which is obtained by inclining the line L2 by 120 degrees in the clockwise direction and that '1' is written on the address area corresponding to an address bit located in the upper portion (hatching line portion) divided by the line L3 and '0' is written on the address area corresponding to an address bit located in the lower portion (white portion) divided by the line L3.

Figure 10A:
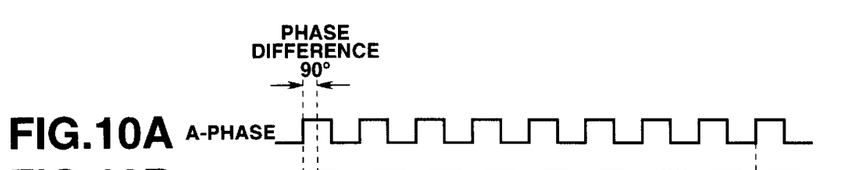
FIGS. 10A to 10E are graphs showing wave forms of A-phase signal, B-phase signal, U-phase signal, V-phase signal and W-phase signal obtained from the apparatus of FIG. 6.
Figures 10B, 10C:
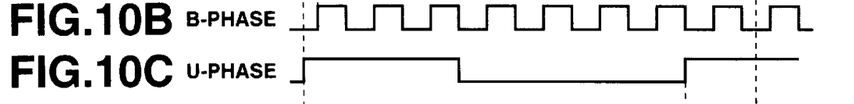
Figure 10D:
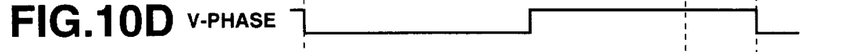
Figure 10E:
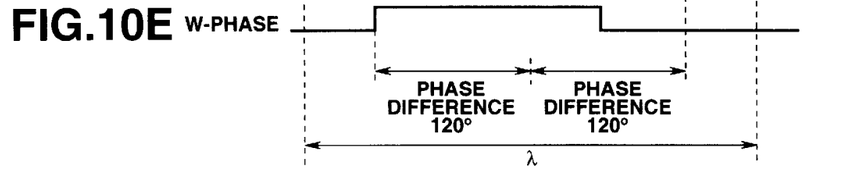

With this arrangement, it becomes possible to read the U-phase signal, the V-phase signal and the W-phase signal, which have a phase difference 120 degrees with each other and form wave forms shown in FIGS. 10C, 10D and 10E according to the change of the signals $\sin(2\pi x/\lambda)$ and $\cos(2\pi x/\lambda)$. The U-phase signal, the V-phase signal and the W-phase signal are sent to an alternating servomotor of a servo mechanism as three-phase signals for controlling the magnetic field.

Figure 8:
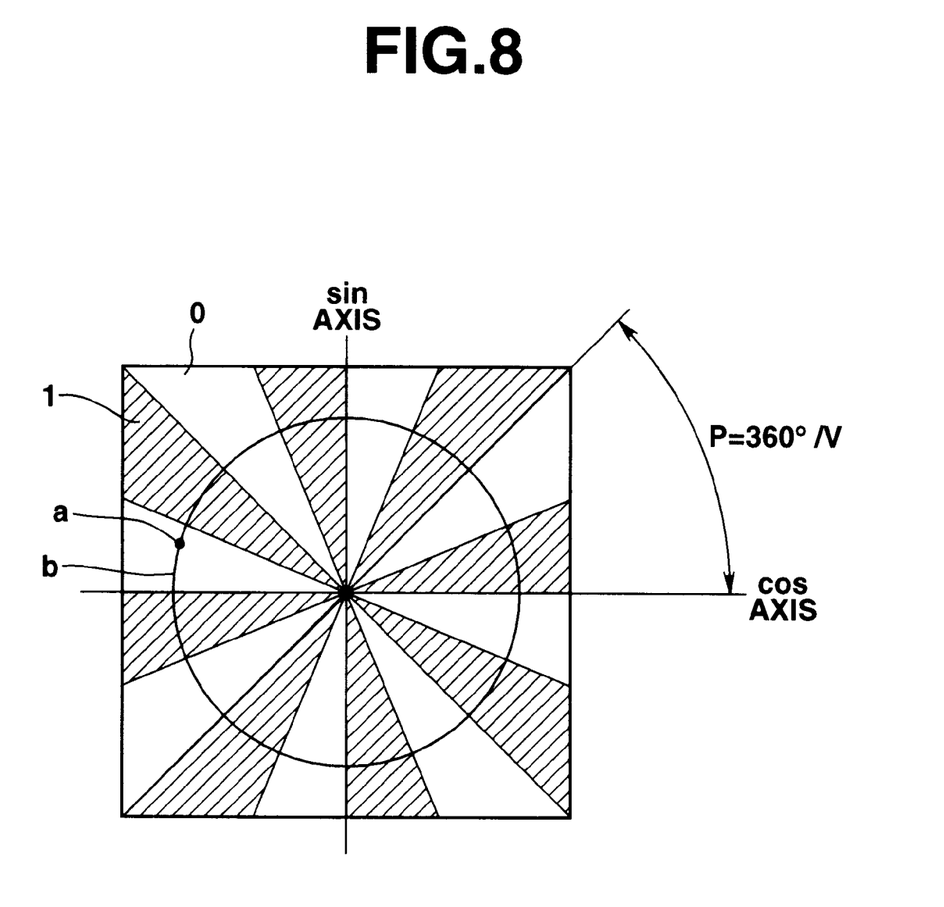
FIG. 8 is a view for explaining a principle of an interpolating method using a pair of ADC and a conversion table.

On the other hand, as to further another one bit of the remaining 13 bits in each address area, the data for interpolating signals of a division number V is written on the basis of a division pattern shown in FIG. 8. As to further another one bit of the other bits in each address area, on the basis of a division pattern shown in FIG. 11 which pattern is obtained by rotating the dividing position of the division pattern of FIG. 8 by 360 degrees/4V, '1' is written on the address area corresponding to an address bit located hatching line portions) and '0' is written on the address area corresponding to white portions.

With this arrangement, it becomes possible to read the A-phase signal and the B-phase signal, which have a phase difference 90 degrees with each other and form wave forms shown in FIGS. 10A and 10B according to the change of the signals sin(2πx/λ) and cos(2πx/λ). The A-phase signal and the B-phase signal are sent to an alternating servomotor of a servo mechanism as two-phase signals for controlling the position and speed.

With the thus arrangement according to the present invention, it becomes possible to simultaneously obtain the two-phase signals for controlling the position and speed of the alternating servomotor and the three-phase signals for controlling the magnetic field of the alternating servomotor, on the basis of the periodic signals of the signals sin(2πx/λ) and cos(2πx/λ) detected by the MR elements from one scale. The A-phase and B-phase signals outputted from a position detecting apparatus are generally required to have several kinds of division numbers although it is not always required to have one kind of division number. Therefore, as to 10 bits of the remaining 11 bits of each address area, the data for A/B phase signals having a different division number V is written on the basis of the division patterns of FIGS. 8 and 11 by 2 bits. This ensures six kinds data having different division number to be preferably stored in the conversion table.

It will be understood that at 12 bit of 13 bits except for 3 bits storing U-phase, V-phase, W-phase signals, the data for four kinds A/B phase signals and the data for origin signal may be stored.

With this interpolating method using the ADC and the conversion table, it becomes possible to ensure advantages that the position detecting apparatus is kept in small size even if the division number is increased and that the high accuracy interpolation signal is obtained by solving the interpolating error due to the strain component in the one cycle of the signals sin(2πx/λ) and cos(2πx/λ) which error is generated by increasing the division number, through a method to correct the division pattern of the circumference on the two dimensional address plane. In addition, since an interpolation signal having a desired division number is obtained by properly changing the division pattern, it becomes possible to ensure advantages that the high accuracy interpolation is easily executed and that the plural kinds A-phase and B-phase signals having different division numbers are previously stored in the conversion table and are desirably used.

Figure 11:
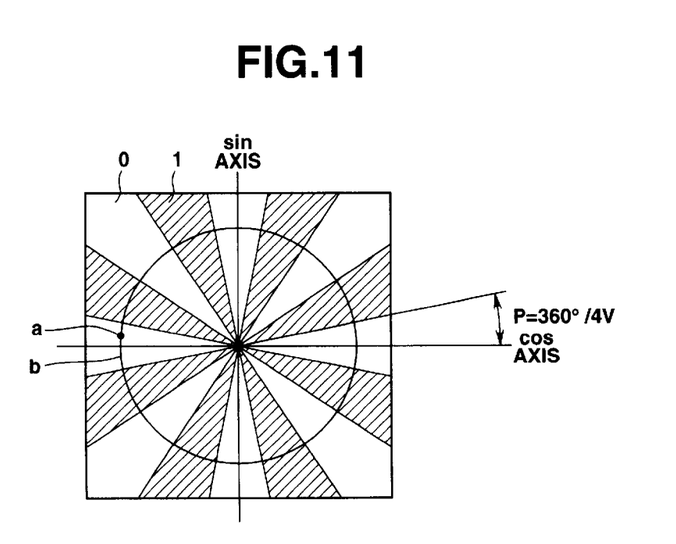
FIG. 11 is a view for explaining a data storage method in the conversion table.

Although the embodiment shown in FIG. 6 has been shown and described such that the data for U-phase, V-phase and W-phase signals and the data for A-phase and B-phase signals are stored in the one conversion table 43, it will be understood that a conversion table 44 storing the data of A-phase and B-phase signals and a conversion table 45 storing the data of U-phase, V-phase and W-phase signals may be separately provided as shown in FIG. 11. In this case, as to the 16 bit of each address area of the conversion table, 8 kinds data of A-phase and B-phase signals, or 6 kinds data of A-phase and B-phase signals and 1 data of the origin signal are stored.

Figure 12:
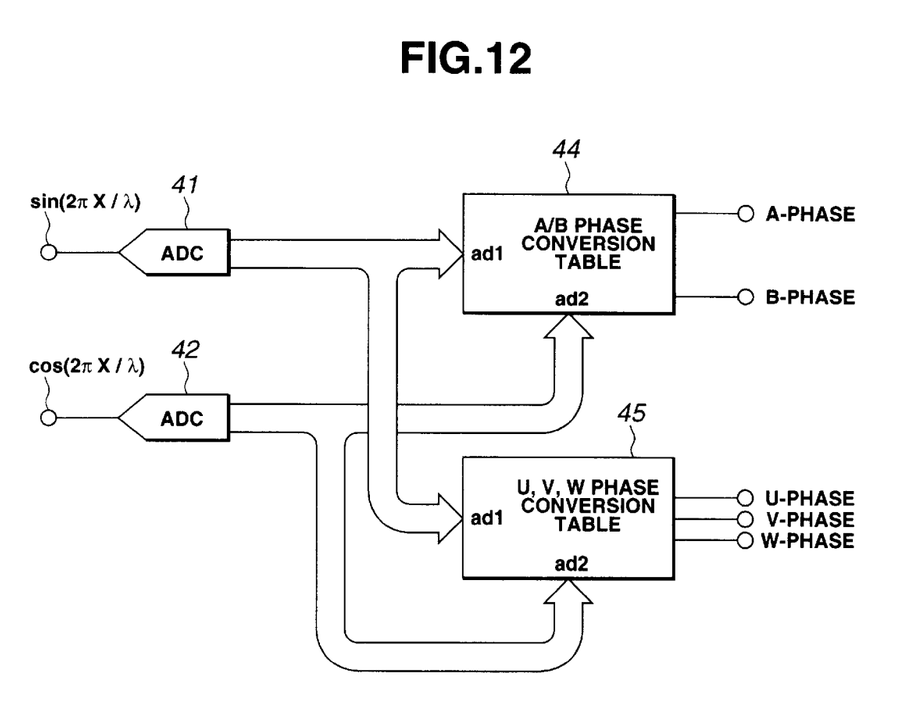
FIG. 12 is a block diagram which shows a modification of FIG. 5.
Figure 13:
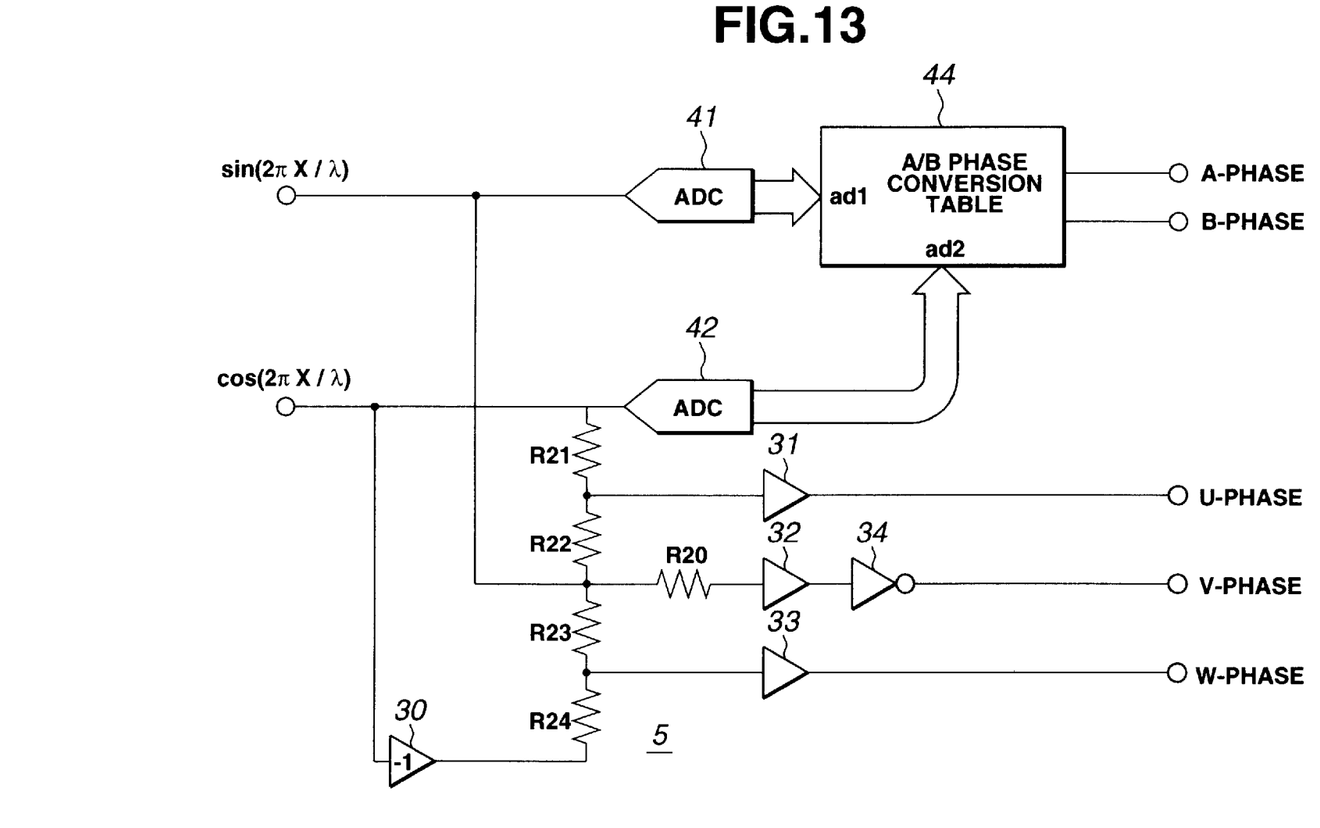
FIG. 13 is a block diagram which shows a third embodiment of the interpolating device of the position detecting apparatus in accordance with the present invention.

FIG. 13 shows a third embodiment of the interpolating device of the position detecting apparatus in accordance with the present invention. The interpolating device of the third embodiment has a hybrid structure in which the data for A-phase and B-phase signals is obtained by using ADC 41 and 42 and the conversion table 44 and the data for U-phase, V-phase and W-phase signals is obtained by the vector adding method. The conversion table 44 receives the digital signals from the ADC 41 and 42 and outputs A-phase and B-phase signals. The same parts as those in FIGS. 3, 5 and 12 are designated by same reference numerals, and the explanation thereof is omitted herein.

Since the A-phase and B-phase signals are required to have various division numbers as mentioned above, it is preferable that the plural kinds of A-phase and B-phase signals are obtained by using the ADC and the conversion table. In contrast, only one kind of pattern is provided for the U-phase, V-phase and W-phase signals. Therefore, in case that it is not required to accurately correspond the phase of the two phase signals for controlling the position and speed of the alternating servo motor with that of the three phase signals for controlling the magnetic field, a hybrid type construction as shown in FIG. 12 may be employed in the interpolating device of the position detecting apparatus.

The preferred embodiments according to the present invention have been shown and described to be applied to a magnetic type position detecting apparatus employing MR elements since the scale for MR elements is preferable to obtain the digital three-phase signal for controlling the magnetic field of the linear alternating servomotor on the basis of the detected periodic signals. That is, the pitch of the scale in the magnetic type position detecting apparatus is relatively rough such that the pitch is generally millimeter unit, and the pitch of the slot in the linear alternating servo motor is generally the same as that of the scale in the magnetic type position detecting apparatus. On the other hand, since the interpolating technique performing a high resolution is developed recently, it becomes possible to obtain the digital two-phase signals of micrometer unit, which signal is preferable for the control of the position and speed of the alternating servomotor, from the periodic signal detected from the scale having rough pitches. Therefore, it is preferable to apply the apparatus according to the present invention to the magnetic type position detecting apparatus employing MR elements in order to control the linear alternating servomotor.

On the other hand, small-sized linear alternating servomotor, which is decreased in size to have a slot pitch ranging from several hundreds to several tens micrometer, is possibly produced according to the progress of the micromachining technique. Therefore, the interpolating apparatus according to the present invention may be applied to a magnetic type position detecting apparatus which detects the periodic signals from a scale having magnetic graduation of micrometer pitch by using a magnetic head of a magnetic flux responsive type, an optical type position detecting apparatus which is of a photoelectric scanning type having slots of micrometer unit pitch in a graduation grid and a scanning plate, or an interference meter type position detecting apparatus in which a further micro pitch is marked on the scale and laser beam is used.

Although the preferred embodiment has been shown and described to be applied to a position detecting apparatus for detecting periodic signals sin(2πx/λ) and cos(2πx/λ) having a phase difference λ/4, the present invention is not limited to the embodiment and may be applied to a position detecting apparatus for detecting two phase signals having a phase difference except for λ/4. Further, the present invention may be applied to a position detecting apparatus for detecting one phase periodic signal and to a position detecting apparatus for detecting three phase periodic signals having a desired phase difference therebetween.

It is to be understood that the invention is not limited its application to the details of construction and arrangement of parts illustrated in the drawings, since the invention is capable of the embodiments and of being practiced or carried out in various ways. Also it is to be understood that the phraseology or terminology employed herein is for the purpose of description and not of limitation.

With the thus arranged position detecting apparatus according to the present invention, it becomes possible to obtain two-phase signals for controlling the position and speed of an alternating servomotor and three-phase signals for controlling magnetic field of the alternating servomotor from a scale unit of one scale and one encoder. This largely simplifies the structure of a servo mechanism employed in the position detecting apparatus and decreases the production cost of this apparatus. Further, it becomes possible to decrease the adjusting steps during installation of this apparatus and steps for assembling this apparatus. In addition, since two-phase signals for controlling the position and speed of an alternating servomotor and three-phase signals for controlling magnetic field of the alternating servomotor are obtained on the basis of the same periodic signals, the offset of the phase difference between the two-phase signals and the three-phase signals are cancelled. This enables the alternating servomotor to be precisely controlled. Furthermore, since one sensor functions to obtain both of the two-phase signals and the three-phase signals, the position detecting apparatus is simplified in structure and is decreased in size.

The entire disclosure of Japanese Patent Application No. 8-285340 filed on Oct. 28, 1996 including specification, claims, drawings and summary is incorporated herein by reference in its entirety.

What is claimed is:

1. A position detecting apparatus comprising:

a single scale having graduation lines marked at predetermined pitches;

a sensor displaceable with respect to said single scale and detecting periodic signals indicative of cycles corresponding to the pitches of the graduation lines; and a plurality of interpolating means for interpolating the periodic signals, the plurality of interpolation means including a first interpolation means for outputting a first integer number of first interpolation signals, and a second interpolation means for outputting a second integer number of second interpolation signals, the first interpolation signals differing in phase from each other by a first predetermined angle, the second interpolation signals differing in phase from each other by a second predetermined angle.

2. A position detecting apparatus as claimed in claim 1, wherein each of said plural interpolating means includes phase shifting means for phase-shifting the periodic signals by means of the vector adding method.

3. A position detecting apparatus as claimed in claim 1, wherein each of said plural interpolating means includes an analog-to-digital converter for converting the periodic signals into digital signals and a conversion table for converting an output signal of the analog-to-digital converter to the interpolation signals.

4. A position detecting apparatus as claimed in claim 1, wherein said first interpolating means includes phase shifting means for phase-shifting the periodic signals by means of the vector adding method, and said second interpolating means includes an analog-to-digital converter for converting the periodic signals into digital signals and a conversion table for converting an output signal of the analog-to-digital converter to the second interpolation signals.

5. A position detecting apparatus as claimed in claim 1, wherein each of said plural interpolating means has a different resolution with respect to each other.

6. A position detecting apparatus as claimed in claim 1, wherein the plural interpolating means further includes a third interpolation means, wherein said first interpolating means outputs three-phase signals, and said second interpolating means outputs two-phase signals which are different in division number from two-phase signals outputted by said third interpolating means.

7. A position detecting apparatus as claimed in claim 1, wherein said single scale and said sensor are of a magnetic type for generating periodic signals according to a displacement of said sensor with respect to said single scale.

8. A position detecting apparatus as claimed in claim 1, wherein the first and second interpolation signals respectively outputted from said first and second interpolating means are supplied to a servo mechanism including a servomotor.

9. A position detecting apparatus as claimed in claim 1, wherein said sensor is constituted by a pair of magnet resistor heads each of which includes a pair of magnetic resistor elements arranged into a bridge structure.

* * * * *